May 10, 1932. H. HUBBELL, JR 1,857,380
POWER STEERING GEAR
Filed Aug. 9, 1929
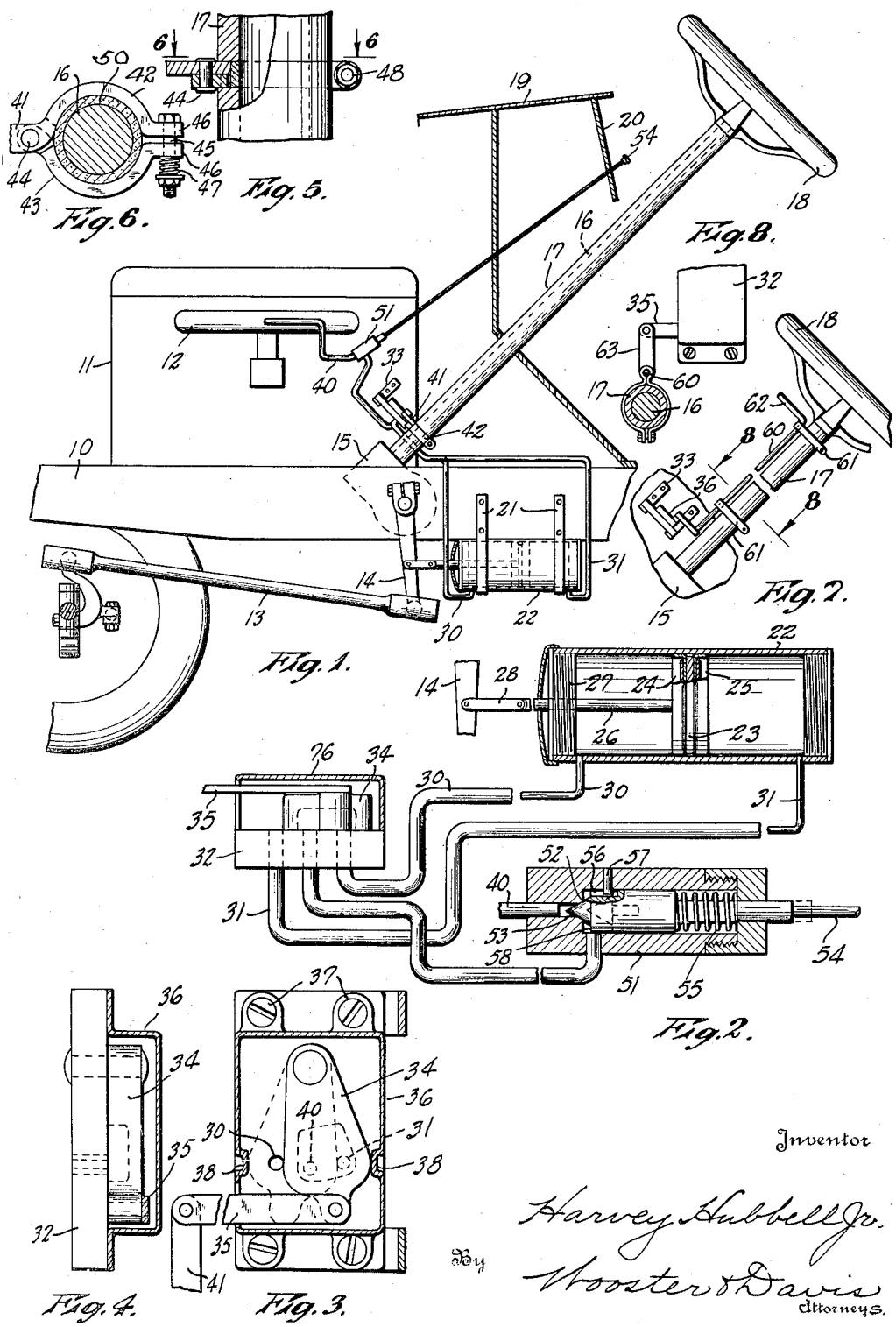
Inventor
Harvey Hubbell Jr.
By Wooster & Davis
Attorneys.

Patented May 10, 1932

1,857,380

UNITED STATES PATENT OFFICE

HARVEY HUBBELL, JR., OF BRIDGEPORT, CONNECTICUT

POWER STEERING GEAR

Application filed August 9, 1929. Serial No. 384,636.

This invention relates to an auxiliary power device for the steering mechanism of a motor vehicle, and has for an object to provide a device for supplying power to the steering mechanism to assist the driver in steering.

A further object of this invention is to provide an auxiliary power device for the steering mechanism which may derive its power from the vehicle motor, and more especially, from the intake manifold of the motor.

A still further object of this invention is to provide an auxiliary power device for the steering mechanism which is especially desirable in assisting the driver when parking or turning around, and which may be disconnected at will when driving straight ahead.

An additional object of this invention is to provide an auxiliary power device for the steering mechanism which may be provided with either manually controllable or automatically controllable means for supplying the power in the proper direction.

With the foregoing and other objects in view the invention consists in certain novel features of construction, combinations and arrangements of parts as will be more fully described in connection with the accompanying drawings.

In these drawings:

Fig. 1 is a graphic view of an embodiment of the invention as applied to a motor vehicle.

Fig. 2 is an enlarged fragmentary, disassociated view of the power conduits and the operating cylinder and piston, the piston and cylinder being on a small scale and partly in section.

Fig. 3 is a plan view of a valve for controlling the pressure to the proper conduit.

Fig. 4 is a side view of Fig. 3.

Fig. 5 is a fragmentary section of the steering shaft and shell at the place where the slip clamp for automatically operating the valve shown in Figs. 3 and 4 is attached.

Fig. 6 is a cross section on line 6—6 of Fig. 5.

Fig. 7 is a plan view of a modified form wherein the valve is manually operated.

Fig. 8 is a section on line 8—8 of Fig. 7.

There is shown at 10 the chassis frame of a motor vehicle having a motor 11 on which is the intake manifold 12. The vehicle has the steering mechanism comprising the steering gear drag link 13 which is operated by the steering lever arm 14, which in turn is operated by the conventional worm and gear means contained in housing 15. The worm and gear is controlled by the steering gear shaft 16 contained in the shell 17 and operated by the steering wheel 18. Mounted on the chassis 10 is the body 19 having the instrument board 20.

Attached to the chassis frame 10 by means of straps 21 is a cylinder 22 having therein a piston 23. The piston 23 has a cup leather packing 24 and 25 on each side so that it may be operated to deliver a power stroke in each direction. A connecting rod 26 is affixed to the piston 23 and passes through a stuffing box 27 at one end of cylinder 22 and has a link 28 connecting it to the steering lever arm 14. Leading into cylinder 22 at each end of the travel of piston 23 are conduit pipes 30 and 31. Conduits 30 and 31 lead to a valve base 32 supported as at 33 and having a pivoted valve 34 which may be shifted by a lever 35 so as to shift the valve 34 over either conduit 30 or 31. A valve shell 36 supported on the base as at 37 may have stops 38 to limit the movement of valve 34, but any other limiting means may be employed either on the valve or on its connected operating elements.

Intermediate the conduits 30 and 31 in base 32 is the conduit 40 leading from the intake manifold 12, the valve 34 serving to connect manifold conduit 40 with either of the cylinder conduits 30 or 31. The valve shifting lever 35 is pivoted to an arm 41 forming part of a slip clamp 42 and includes another arm 43 pivoted thereto as at 44. A bolt 45 passing through ears 46 on arms 41 and 43 has a spring 47 whose tension is adjusted by nut 48. This slip clamp 42 is fitted about a fiber lining 50, which may be of conventional brake lining material, around the steering gear shaft 16 through an opening in shell 17.

Manifold conduit 40 has a shut off valve 51 therein, comprising a valve seat 52, and a needle valve 53. A manual rod 54 passing through instrument board 20 serves to withdraw the needle 53 against spring 55. The needle 53 has a slot 56 for a stop pin 57 projecting through the side of the valve 51 and has a shoulder 58 which will abut against pin 57 to hold the valve open when the needle 53 has been withdrawn and turned a partial revolution by means of rod 54. To shut the valve, it is only necessary to turn rod 54 and when the recess 56 is properly lined up with pin 57, spring 55 will close and hold in place the needle 52.

The operation is as follows. The device is principally intended for use in assisting the driver to cramp or turn the wheels when parking or turning around, at which time, due to the slow speed of the vehicle and the large angle to which the wheels must be turned, it is much more difficult to turn the steering wheel. To place the device in operation, the operator draws out the rod 54 and turns it, whereupon the valve 51 opens the manifold conduit 40. In straight ahead driving the valve 34 is in the neutral position between the entrances to conduits 30 and 31 and the small movements of the wheel for straight ahead driving are not sufficient to shift this valve to cause the piston to function. If the operator wishes to turn around or park, he operates his steering wheel as usual. A given turning of the steering wheel in the direction it is desired to turn serves to turn slip clamp 42 with it and through lever 35 to push or pull the valve 34 to connect the proper cylinder conduit 30 or 31 with the suction conduit 40. Continued turning of the shaft 16 will cause clamp 42 to slip thereon, the tension of spring 47 having been properly adjusted. When the manifold conduit and the proper cylinder conduit are thus connected, air in the cylinder on one side of the piston 23 is drawn into the manifold by the continued operation of the vehicle motor, thus tending to create a low pressure or vacuum on one side of the piston 23. The other cylinder conduit will then be open to atmospheric pressure through the opening in shell 36 through which lever 35 operates, and the piston 23 will be pushed toward the side on which the vacuum is being created. This will have the effect of drawing the connecting rod 26 with the piston 23, and through link 28 will move steering gear arm 14. To assure the driver retaining complete control over the operation of the vehicle, the cylinder 22 and the parts therein are preferably of such a size that the power created thereby is not in itself sufficient to turn the steering mechanism but is sufficient to supply all but a fraction of the power necessary to turn the steering mechanism, and hence is an auxiliary power device. To turn the wheels in the opposite directions, the driver merely reverses the steering wheel as usual, and the initial turning movement thereof, will, through the slip clamp 42, shift valve 34 to connect the other of the cylinder conduits to the manifold conduit, thereby operating piston 23 in the opposite direction and assisting in turning the wheels in the opposite direction. When the car is straightened out or driving straight ahead the valve 34 will be in a neutral or intermediate position between the entrances to conduits 30 and 31 so the device will have no effect on the straight away driving for which it is not needed the small turning movements of the steering wheel for this driving not being sufficient to place the device in operation. When the turning or parking operation is completed, the driver may merely turn rod 54 and spring 55 will then close valve 51 to disconnect the manifold conduit 40. Thus it will be obvious that when the manifold conduit is opened, the device herein disclosed will automatically assist the driver in turning the steering mechanism in either direction for turning around and parking, making such an operation much easier for the driver.

In Figs. 7 and 8 is shown a manually controlled auxiliary power device which is controlled by a rod 60 instead of the automatic means above set forth. This rod 60 is held in place on the steering gear shell 17 by a pair of clamps 61, and has a manual control lever 62 placed convenient to the steering wheel 18. Rod 60 has a link 63 connecting it to valve lever 35 of the valve 34. In this modified form, instead of operating automatically with the turning of steering wheel 18, the driver merely turns lever 62 in the direction he wishes to turn his steering wheel, and the auxiliary power mechanism operates in the same manner as above.

Although shown as being preferably operated from the intake manifold, it will be apparent that the difference in pressure on opposite side of piston 23 is the operating power means, and that the difference in pressure, instead of being created by a vacuum, might also be created by adding a higher pressure on one side than the other, as by substituting a pressure tank, as of compressed air, for the manifold and connecting conduit 40 to such pressure tank, which particular form might be desirable in motor vehicles which are operated by electric motors having no intake manifold; or in cars such as buses where compressed air is used for operated the brakes.

Thus it will be seen that there has been provided an auxiliary power mechanism to assist the driver in turning the wheels, which may be either manually or automatically controlled, and which may be shut off at will. It will be also apparent that no additional motors or power means are necessary for operation hereof, except the piston, the power being taken from the vehicle motor and hence will always be available whenever the vehicle is being operated, there thus being no additional motors to care for. Further, there is likewise no operating expense due to the use of the excess power of the vehicle motor.

Having thus set forth the details of this invention, what is claimed is:

1. In a steering mechanism for motor vehicles having a steering shaft and a steering lever arm operatively connected to the shaft, a cylinder, a low pressure operated piston in said cylinder operatively connected to the steering lever arm, conduits leading to said cylinder to each end of the travel of said piston, a conduit leading from the intake manifold of the vehicle motor, a valve for connecting said manifold conduit to either of the cylinder conduits, means for operating said valve including a slip clamp fitted about the steering shaft, a valve shifting lever operatively connected to said slip clamp, and means limiting the movement of the clamp in either direction.

2. In a steering mechanism for motor vehicles having a steering shaft and a steering lever arm operatively connected to the shaft, a cylinder, a low pressure operated piston in said cylinder operatively connected to the steering lever arm, conduits leading to said cylinder to each end of the travel of said piston, a conduit leading from the intake manifold of the vehicle motor, a valve for connecting said manifold conduit to either of the cylinder conduits, means for operating said valve including a slip clamp fitted about the steering shaft, a valve shifting lever operatively connected to said slip clamp, means limiting the movement of the clamp in either direction and a cut off valve in the manifold conduit, and a manually operated means for operating said cut off valve.

In testimony whereof I affix my signature.

HARVEY HUBBELL, Jr.